United States Patent
Blessing

(10) Patent No.: US 8,840,235 B2
(45) Date of Patent: Sep. 23, 2014

(54) PRINT HEAD, UPGRADE KIT FOR A CONVENTIONAL INKJET PRINTER, INKJET PRINTER AND METHOD FOR PRINTING OPTICAL STRUCTURES

(75) Inventor: Kurt Blessing, Lüdenscheid (DE)

(73) Assignee: Luxexcel Holding B.V., Wolphaartsdijk (NL)

( * ) Notice: Subject to any disclaimer, the term of this patent is extended or adjusted under 35 U.S.C. 154(b) by 364 days.

(21) Appl. No.: 13/153,683

(22) Filed: Jun. 6, 2011

(65) Prior Publication Data

US 2011/0298877 A1 Dec. 8, 2011

(30) Foreign Application Priority Data

Jun. 7, 2010 (EP) .................................... 10005841

(51) Int. Cl.
*B41J 2/01* (2006.01)

(52) U.S. Cl.
USPC ........................................................ 347/102

(58) Field of Classification Search
None
See application file for complete search history.

(56) References Cited

U.S. PATENT DOCUMENTS

| | | | |
|---|---|---|---|
| 1,918,705 A | 7/1933 | Ives | |
| 1,942,841 A | 1/1934 | Shimizu | |
| 3,241,429 A | 3/1966 | Rice et al. | |
| 3,622,384 A | 11/1971 | Davey et al. | |
| 5,293,437 A | 3/1994 | Nixon | |
| 5,330,799 A | 7/1994 | Sandor et al. | |
| 5,694,246 A | 12/1997 | Aoyama et al. | |
| 5,707,684 A | 1/1998 | Hayes | |
| 5,723,176 A | 3/1998 | Keyworth et al. | |
| 5,800,907 A | 9/1998 | Yumoto | |
| 6,297,911 B1 | 10/2001 | Nishikawa et al. | |
| 6,364,459 B1 * | 4/2002 | Sharma et al. | 347/51 |
| 6,481,844 B1 | 11/2002 | Beery | |
| 6,805,902 B1 | 10/2004 | Hayes | |
| 6,833,960 B1 | 12/2004 | Scarbrough et al. | |
| 6,856,462 B1 | 2/2005 | Scarbrough et al. | |
| 7,393,095 B2 * | 7/2008 | Oshima et al. | 347/102 |
| 7,428,103 B2 | 9/2008 | Boettiger et al. | |
| 7,609,451 B1 | 10/2009 | Scarbrough | |
| 8,007,896 B2 | 8/2011 | Hicks et al. | |
| 8,472,118 B2 | 6/2013 | Gugian et al. | |

(Continued)

FOREIGN PATENT DOCUMENTS

| | | |
|---|---|---|
| DE | 10060304 A1 | 4/2000 |
| DE | 102005/039113 A1 | 2/2007 |

(Continued)

OTHER PUBLICATIONS

Cox, W.R. et a., "Microjet Printing of Anamorphoc Microlens Arrays," SPIE vol. 2687, pp. 89-98.

(Continued)

*Primary Examiner* — Matthew Luu
*Assistant Examiner* — Tracey McMillion
(74) *Attorney, Agent, or Firm* — The Dobrusin Law Firm, P.C.

(57) ABSTRACT

The inventions relates to a print head for printing optical structures on a substrate comprising an ejection device for ejecting at least one droplet of a printing ink towards the substrate and a curing device for curing the at least one deposited droplet, wherein the curing device comprises at least one UV-LED (ultraviolet emitting light-emitting diode).

35 Claims, 5 Drawing Sheets

(56) References Cited

U.S. PATENT DOCUMENTS

| | | |
|---|---|---|
| 2002/0027300 A1 | 3/2002 | Hartmann et al. |
| 2002/0104973 A1 | 8/2002 | Kerekes |
| 2002/0171177 A1 | 11/2002 | Kritchman et al. |
| 2003/0122055 A1 | 7/2003 | Rughani |
| 2004/0045931 A1 | 3/2004 | Hill et al. |
| 2004/0231594 A1 | 11/2004 | Edwards et al. |
| 2004/0233265 A1 | 11/2004 | Kojima |
| 2005/0059766 A1 | 3/2005 | Jones |
| 2005/0088750 A1 | 4/2005 | Hasei |
| 2005/0133688 A1 | 6/2005 | Li et al. |
| 2006/0079036 A1 | 4/2006 | Su et al. |
| 2006/0262410 A1 | 11/2006 | Toyoda |
| 2006/0279036 A1 | 12/2006 | Hasei et al. |
| 2006/0279945 A1 | 12/2006 | Hasei et al. |
| 2007/0126074 A1 | 6/2007 | Chuang |
| 2007/0229950 A1 | 10/2007 | Ouderkirk |
| 2008/0049088 A1 | 2/2008 | Codos |
| 2008/0074887 A1* | 3/2008 | Nakata et al. ............ 362/310 |
| 2009/0016757 A1 | 1/2009 | Priebe |
| 2009/0220708 A1 | 9/2009 | Schmitt |
| 2009/0244230 A1* | 10/2009 | Ohnishi et al. ............ 347/102 |
| 2009/0267269 A1 | 10/2009 | Lim |
| 2010/0208006 A1 | 8/2010 | Selinfreund |
| 2011/0116152 A1 | 5/2011 | Guigan et al. |
| 2012/0019936 A1 | 1/2012 | Blessing et al. |
| 2013/0071568 A1 | 3/2013 | Guigan |
| 2013/0133274 A1 | 5/2013 | Blessing |

FOREIGN PATENT DOCUMENTS

| | | |
|---|---|---|
| DE | 102006/003310 | 2/2009 |
| EP | 0489650 A1 | 6/1992 |
| EP | 1225472 A2 | 7/2002 |
| EP | 1240878 | 9/2002 |
| EP | 1428675 A2 | 6/2004 |
| EP | 1637926 A2 | 3/2006 |
| FR | 10-01854 | 4/2010 |
| FR | 10-02340 | 6/2010 |
| GB | 2350321 | 11/2000 |
| JP | 2006/343449 A | 12/2006 |
| JP | 2008/286973 A | 11/2008 |
| JP | 2009292091 A * | 12/2009 |
| WO | 95/09372 A1 | 4/1995 |
| WO | 97/48557 | 12/1997 |
| WO | 98/20392 | 5/1998 |
| WO | 99/11735 A1 | 3/1999 |
| WO | 99/36830 A1 | 7/1999 |
| WO | 2004/096527 | 11/2004 |
| WO | 2005/113219 | 1/2005 |
| WO | 2006/029268 A2 | 3/2006 |
| WO | 2006/135776 | 12/2006 |
| WO | 2008/029128 A2 | 3/2008 |
| WO | 2009/147353 | 12/2009 |
| WO | 2011/151536 A1 | 12/2011 |
| WO | 2012/093086 A1 | 7/2012 |
| WO | 2012/136902 A1 | 10/2012 |

OTHER PUBLICATIONS

Chen, Chin-Tai, et al., "Dynamic evolvement and formation of retractive microlenses self-assembled from evaporative polyurethane droplets," Sensors and Actuators A 147 (2008) p. 369-377.

European Search Report, application No.: EP 10005841, dated Feb. 21, 2011, published as EP 2392473A1.

Co-Pending U.S. Appl. No. 13/201,255 filed on Oct. 6 2011, Published as US2012/0019936 dated Jan. 26, 2012.

European Office Action, Application No.: 10 005 841.1 dated Nov. 20, 2012.

Potentially related application, U.S. Appl. No. 13/924,974, filed Jun. 24, 2013, published as WO2012/093086.

Potentially related application, U.S. Appl. No. 13/637,455, published as 2013/0133274, publication date May 30, 2013.

French priority document FR1002340, filed Jun. 3, 2012, which corresponds to US 2013/0071568.

French Priority document FR2973911, filed Apr. 21, 2011.

French Priority document FR0802636, filed May 15, 2008, which corresponds to US2011/0116152.

French Priority document FR0802819, filed May 26, 2008, which corresponds to US2011/0116152.

French Priority document FR0802821, filed May 26, 2008, which corresponds to US2011/0116152.

French Priority document FR0803831, filed Jul. 7, 2008, which corresponds to US2011/0116152.

French Priority document FR0804067, filed Jul. 17, 2008, which corresponds to US2011/0116152.

French Priority document FR0804451, filed Aug. 5, 2008, which corresponds to US2011/0116152.

French Priority document FR0804981, filed Sep. 11, 2008, which corresponds to US2011/0116152.

French Priority document FR0805642, filed Oct. 13, 2008, which corresponds to US2011/0116152.

French Priority document FR0806433, filed Nov. 18, 2008, which corresponds to US2011/0116152.

French Priority document FR0806434, filed Sep. 17, 2008, which corresponds to US2011/0116152.

French Priority document FR0806855, filed Dec. 8, 2008, which corresponds to US2011/0116152.

French Priority document FR0807499, filed Dec. 30, 2008, which corresponds to US2011/0116152.

French Priority document FR0900222, filed Jan. 19, 2009, which corresponds to US2011/0116152.

French Priority document FR0802556, filed May 13, 2008, which corresponds to US2011/0116152.

French Priority document FR0805222, filed Sep. 23, 2008, which corresponds to US2011/0116152.

French Priority document FR0806995, filed Dec. 12, 2008, which corresponds to US2011/0116152.

* cited by examiner

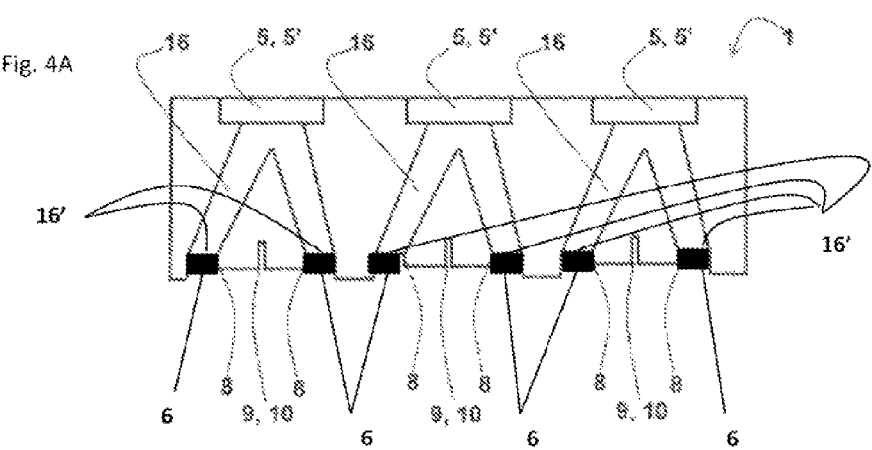

PRINT HEAD, UPGRADE KIT FOR A CONVENTIONAL INKJET PRINTER, INKJET PRINTER AND METHOD FOR PRINTING OPTICAL STRUCTURES

CLAIM OF PRIORITY

The present application claims the benefit of the priority of the filing date of the European application, EP 10005841.1 filed 7 Jun. 2010, which is herein incorporated by reference for all purposes.

BACKGROUND

The present invention relates to a print head for printing optical structures on a substrate comprising an ejection device for ejecting at least one droplet of a printing ink towards the substrate and a curing device for curing the at least one deposited droplet.

It is common knowledge that products provided with optical structures can be manufactured in a comparably time-saving and inexpensive way by printing the optical structures directly on an appropriate substrate. Suchlike imprinted optical structures comprise lenses, mirrors or retroreflectors, for instance. The substrate can be made of synthetic material or glass. Furthermore, it is well known to cure the imprinted material by using light irradiation for reducing the overall printing time.

For Example, German patent application DE 10 2006 003.310 A1 discloses a method for producing optical lenses from a moldable transparent material comprises a first step of depositing the material on a substrate in a layer that is cured by a laser or by UV irradiation in a subsequent second step.

The drawback of such an approach is that a mercury-vapor lamp, usually used as UV source, or a laser are very expensive and that it is very difficult to implement suchlike light source into a compact and movable print head.

In particular, an integration of suchlike print heads in conventional inkjet printers in order to easily upgrade a conventional inkjet printer for printing optical structures at reasonable prices is not feasible.

SUMMARY

An object of the present invention is to provide a print head, an upgrade kit for a conventional inkjet printer, an inkjet printer and a method for printing optical structures that allows a very fast printing process by using a cost-effective and compact print head.

The object of the present invention is achieved by a print head for printing optical structures on a substrate comprising an ejection device for ejecting at least one droplet of a printing ink towards the substrate and a curing device for curing the at least one deposited droplet, wherein the curing device comprises at least one UV-LED (ultraviolet emitting light-emitting diode).

According to the present invention, it is thereby advantageously possible to provide a very compact and cost-efficiently print head which comprises a curing device for a very fast curing of the at least one droplet by using the at least one UV-LED as the curing device. UV-LED's require only little installation space at reasonably costs. In particular, it is herewith advantageously possible for the first time to integrate a print head for rapidly printing optical structures into a conventional inkjet printer. Optical structures in the sense of the present invention in particular comprise micro lenses, Fresnel structures, optical prisms and the like, which are made of multiple droplets of printing ink deposited by the printing head. The printing ink preferably comprises a transparent material. In order to build up the optical structure, the droplets have to be arranged side by side and one above the other, preferably partly overlapping each other, so that the optical structure mainly forms a 3D-structure which optically influences light passing the optical structure and/or the substrate. Consequently, a new droplet deposited on the 3D structures has timely to be cured to avoid that the new deposited droplet flows off the 3D structure. This aim can be achieved by using the UV LED as the curing device, because on the one hand the switching times of UV LED's are comparably short and on the other hand UV LED's provide high radiation power. Consequently, It is because of the usage of UV LED's as curing devices that it has become possible to build up complex and high optical structures.

According to another preferred embodiment of the present invention, the curing device comprises light guide means conducting ultraviolet light from the at least one UV-LED towards the deposited droplet, wherein the light guide means preferably comprises a light exit opening provided on the substrate facing side of the print head and/or wherein the light guide means is configured for collecting ultraviolet light from multiple UV-LED's and/or for distributing ultraviolet light on multiple light exit openings. The advantage of this approach is that it is not necessary to provide the UV LED on the substrate facing side of the printing head. Consequently, the UV LED can be located at a easily accessible position, so that maintenance, repair and/or replacement services can be performed significantly simpler. Furthermore, this approach requires less installation space in the area of the ejecting device. Another advantage is that preferably the ultraviolet light of multiple UV LED's can be guided by the light guide means to a single light exit opening in order to increase the curing performance. Vice versa, it is also conceivable that the ultraviolet light of one single UV LED's is preferably distributed to multiple light exit openings in order to decrease the total number of required UV LED's.

According to the present invention, it is very much preferred that the curing device is provided with at least one focusing optic for focusing ultraviolet light emitted by the at least one UV-LED towards the at least one deposited droplet, wherein preferably the focusing parameters of the focusing optic are adjustable. In this way, unintentional affecting of adjacent optical structures or previously deposited printing ink can be avoided. Furthermore, the required maximum performance of the UV-LED can be reduced. Preferably, the focusing parameters are adjusted depending on the deposited droplet, so that the diameter of the illuminated surface can be adapted to the size of the deposited printing ink to be cured. The focusing optic comprises e.g. lenses, light guides, mirrors and/or apertures. Preferably, the focusing optic is furthermore applicable for adjusting and in particular for optimizing the cone angle of the light cone. The light guide means are particularly provided between the UV LED and the at least one focusing optic.

Furthermore according to the present invention, it is preferred that the print head comprises at least one shielding means in order to avoid straight irradiation of the ejecting device by ultraviolet light. The shielding means are preferably provided at least partially between the ejection device and the at least one UV-LED and/or at least partially between the ejection device and the at least one light exit opening of the light guiding means. Thereby, it is advantageously possible to avoid an unintentional curing of printing ink residua in the ejecting opening of the ejection device by the ultraviolet light, so that the risk of a clogged ejection device is reduced.

The shielding means preferably comprises shielding panels and/or shielding edge. Particularly preferably the UV LED and/or the light exit opening are provided inside a recess of the substrate facing side of the printing head (comprising the ejection opening), so that the side wall of the recess forms a shielding edge in the sense of the present invention.

Particularly, the print head is movable relative to the substrate, wherein the print head is movable in parallel to a plane of the substrate to deposit droplets of the printing ink at a certain position on the substrate and/or wherein the print head is movable perpendicularly to the plane of the substrate to adjust the distance between the ejecting device and the substrate. It is herewith advantageously possible that the position of the print head relatively to the substrate and therefore also the positions of the deposited droplets relatively to the substrate are software-controlled.

In a preferred embodiment of the present invention, at least the ejection device is rotatable in such a manner that an ejection direction of the at least one droplet of printing ink is movable relatively to the substrate and preferably parallel to a conveying direction of the substrate. Preferably, the ejection device is rotatably supported around a pivot axle extending perpendicular to the conveying direction and parallel to the plane of the substrate, wherein preferably the print head comprises a stepper motor swiveling the ejection device about the pivot axle. It is herewith advantageously possible to adjust the position of the deposited droplet on the substrate relatively to the conveying direction. Thus, multiple droplets can be deposited on the same position of the substrate one above the other, while the substrate continually moves along the conveying direction. Furthermore, inaccuracies in the position of the substrate along the conveying direction can be compensated by correspondingly adjusting the ejection direction. Another advantage of this approach is that by adjusting the ejection direction the shape of the deposited droplet on the substrate can be influenced, as the symmetry or asymmetry of the deposited droplet depends on the angle between the ejection direction and the plane of the substrate.

Preferably, the at least one UV-LED substantially emits ultraviolet light with wavelengths between 2 and 380 nanometer and in particular between 320 and 380 nanometer (also mentioned to as near UV), which advantageously provides on the one hand a rapid curing of the printing ink and on the other hand a reduced risk that hard UV-radiation affects a user of the print head.

According to the present invention, it is preferred that the at least one UV-LED is embodied substantially annularly, wherein the ejection device is located in the center of the ring-like UV-LED, in order to optimize the compactness and the curing efficiency of the print head. Alternatively, a plurality of ejection devices or nozzles of ejection devices are located inside of the ring-like UV-LED.

According to the present invention, it is very much preferred that the curing device comprises at least two UV-LED's and/or two light exit openings, wherein the at least two UV-LED's and/or the light exit openings are provided in such a manner that the light cones emitted by each of the at least two UV-LED's and/or light exit openings overlap each other in the area of the at least one deposited droplet. Thereby, it is advantageously possible to increase the energy deposition in the area of the deposit printing ink to be cured and consequently to decrease the overall curing time. Preferably, a light exit opening in the sense of the present invention comprises the light exit opening of the light guide means and/or a light exit opening of the focusing optics.

Preferably, the power of the at least two UV-LED's and/or the ultraviolet light emitted by at least two light exit openings are adjusted in such a manner, that the deposited droplets are substantially cured only in the overlapping area of the light cones emitted by each of the at least two UV-LED's and/or light exit openings, in particular during a period of time shorter than 250 milliseconds and preferably shorter than 50 milliseconds. Advantageously, an unintentional affecting of adjacent optical structures or previously deposited printing ink can be avoided. Furthermore, the required maximum performance of the UV-LED can be reduced.

According to a preferred embodiment of the present invention, a first UV-LED of the at least two UV-LED's is capable of emitting ultraviolet light of a first wavelength range and a second UV-LED of the at least two UV-LED's is capable of emitting ultraviolet light of a second wavelength range, wherein the second wavelength range differs at least partially from the first wavelength range. Preferably, the print head comprises at least a first and a second ejection device, wherein the first ejection device is capable of ejecting at least one droplet of a first printing ink and wherein the second ejection device is capable of ejecting at least one droplet of a second printing ink, wherein the first printing ink is curable by ultraviolet light of the first wavelength range and wherein the second printing ink is curable by ultraviolet light of the second wavelength range. It is hereby advantageously possible to cure different deposited droplets at different times which enable fast printing of comparatively complex optical structures. In particular, the size of the at least one droplet of the first printing ink differs from the size of the at least one droplet of the second printing ink. Consequently, the overall printing time can be reduced, as e.g. rough structures are printed with bigger droplets, wherein fine structures are printed with smaller droplets. It is even conceivable that the second printing ink differs from the first printing ink in at least one physical parameter, wherein the physical parameters preferably comprises curing time, curing temperature, curing wavelength, viscosity, transmittance and/or optical transparency. It is herewith advantageously possible to print certain portions of the optical structures providing certain optical effects compared to other portions of the optical structures, e.g. by printing the certain portions with printing ink which provides a certain optical transparency. Preferably, the print head comprises at least a first and a second ink tank, wherein the first ink tank comprises the first printing ink and the second ink tank comprises the second printing ink and wherein the first ejecting device is connected to the first ink tank and the second ejecting device is connected to the second ink tank.

Furthermore according to the present invention, it is preferred that the UV-LED, the light guide means and/or the focusing optics are provided in such a manner that the ultraviolet light emitted by the at least one UV-LED and/or by the light exit opening towards the at least one deposited droplet comprises an aperture angle smaller than 30 degrees. Preferably, the aperture angle is smaller than 20 degrees and particularly preferably the aperture angle is smaller than 15 degrees. It is herewith advantageously possible to precisely cure only certain portions and/or certain deposited droplets on the substrate.

In particular, the printing ink comprises a transparent material, preferably a transparent polymer. The substrate preferably comprises a synthetic film or plate material and/or glass.

According to the present invention, it is preferred that the print head comprises a receptacle for an ink cartridge containing the printing ink and/or a connecting piece for receiving the printing ink via an external supply system.

Another object of the present invention is an upgrade kit for a conventional inkjet printer for printing optical structures on a substrate comprising a print head in accordance with the present invention. Thereby, it is advantageously possible that the print head according to the present invention can be applied in a conventional inkjet printer in order to upgrade the inkjet printer for optic printing applications. For example, upgrading the conventional inkjet printer comprises a step of removing the conventional inkjet printer head of the conventional inkjet printer and replacing it by the print head according to one of the claims 1 to 19. In addition, the firmware and/or the software drivers of the inkjet printer are preferably updated in a further step.

Another object of the present invention is an inkjet printer comprising a print head in accordance with the present invention.

Another object of the present invention is a method for printing optical structures on a substrate by using a print head, in particular according to one the claims 1 to 19, comprising the steps of providing the substrate, ejecting at least one droplet of a printing ink towards the substrate and curing the at least one deposited droplet, characterized in that curing the at least one deposited droplet is performed by using ultraviolet light emitted from at least one UV-LED (ultraviolet emitting light-emitting diode). Preferably, the steps of ejecting the at least one droplet and curing the at least one deposited droplet are repeated one or more times in order to generate the optical structure.

According to the present invention, it is very much preferred that the ultraviolet light is focused on the at least deposited droplet to be cured by focusing optic and/or that the ultraviolet light is conducted from the at least UV LED to the at least one deposited droplet by using light guide means.

Furthermore according to the present invention, it is preferred that the method comprises a step of moving the print head to a certain position relatively to the substrate, preferably before ejecting the at least one droplet.

According to another embodiment of the present invention, the method comprises a step of conveying the substrate relatively to the printing head along a conveying direction and preferably a step of rotating the ejection device about a pivot axle extending perpendicular to the conveying direction and parallel to the plane of the substrate. It is herewith advantageously possible to adjust the position of the deposited droplet on the substrate relatively to the conveying direction. Thus, multiple droplets can be deposited on the same position of the substrate one above the other, while the substrate continually moves along the conveying direction. Furthermore, inaccuracies in the position of the substrate along the conveying direction can be compensated by correspondingly adjusting the ejection direction. Another advantage of this approach is that by adjusting the ejection direction the shape of the deposited droplet on the substrate can be influenced, as the symmetry or asymmetry of the deposited droplet depends on the angle between the ejection direction and the plane of the substrate.

According to the present invention, it is preferred that the steps of moving the print head, ejecting the at least one droplet and curing the at least one deposited droplet are repeated one or more times in order to generate the optical structure. In a preferred embodiment the print head contains a plurality of different ejecting devices, wherein each ejecting device ejects different and/or equal printing inks and wherein the ejection of the ejecting devices occurs simultaneously and/or subsequently.

According to a further embodiment of the present invention, it is preferred that the quantity of the ejected printing ink to generate the at least droplet is adjusted depending on the optical structure to be printed and/or depending on the position of the print head relatively to the substrate. It is herewith advantageously possible, that the optical parameters of the optical structures can be influenced by correspondingly adjusting the quantity of the ejected printing ink. Preferably, the printer head ejects smaller and bigger droplets of the printing ink in order to rapidly generate a certain geometry of the optic structure. Furthermore, the shape of the deposited droplets can be modified by adjusting the distance between the print head and the substrate, for instance.

According to another embodiment of the present invention, it is preferred that the at least one deposited droplet is cured by ultraviolet light emitted from at least two UV-LED's, wherein preferably the power of the at least two UV-LED's is adjusted in such a manner that the deposited droplets are substantially cured only in the overlapping area of the light cones emitted by each of the at least two UV-LED's, in particular during a period of time shorter 250 milliseconds and preferably shorter than 50 milliseconds. Preferably, the at least two UV-LED's are configured for being enabled sequentially. Thereby, it is advantageously possible that the at least one deposited droplets is firstly only irradiated by a single UV-LED's, so that said droplet may deform depending on the shape of the substrate's surface or depending on gravity forces or the like, and that only afterwards the droplet is properly cured by irradiation from both UV-LED's.

According to another preferred embodiment of the present invention, the step of curing the at least one droplet is performed by firstly activating a first UV-LED of the at least two UV-LED's and subsequently activating a second UV-LED of the at least two UV-LED's. Preferably, the step of curing the at least one droplet comprises a step of emitting ultraviolet light of a first wavelength range from a first UV-LED of the at least two UV-LED's and a step of emitting ultraviolet light of a second wavelength range from a second UV-LED of the at least two UV-LED's, wherein the second wavelength range at least partly differs from the first wavelength range. Preferably, the method comprises a step of ejecting at least one droplet of a first printing ink and a step of ejecting at least one droplet of a second printing ink, wherein the size of the at least one droplet of the first printing ink differs from the size of the at least one droplet of the second printing ink and/or wherein the second printing ink differs from the first printing ink in at least one physical parameter, wherein the physical parameters preferably comprises curing time, curing temperature, curing wavelength, viscosity, transmittance and/or optical transparency. Preferably, the first printing ink is curable by ultraviolet light of a first wavelength range and wherein the second printing ink is curable by ultraviolet light of a second wavelength range, wherein the second wavelength range at least partially differs from the first wavelength range. Preferably, the first printing ink is ejected by a first ejection device and the second printing ink is ejected by a second ejection device, wherein preferably the first ejection device is connected to a first ink tank and the second ejection device is connected to a second ink tank. As described above, the overall printing time can hereby be reduced and it is advantageously possible to print certain portions of the optical structures providing certain optical effects.

According to another embodiment of the present invention, it is preferred that the method comprises a step of printing a visible picture onto the substrate by the print head and/or by a further print head, preferably before, during or after the optical structure is printed onto the substrate. The printed picture comprises, in particular, a motif, specified optical effects being generated by the optical structure when the motif is observed. In particular, the optical structure is adjusted to the motif in such a way that only the optical appearance of partial areas of the motif is correspondingly modified by the optical structure. The motif can be produced by means of transparent or non-transparent printing ink according to choice. The picture represents, for example, the picture of a landscape, an object, a photo, a lettering or similar. Logos or alphanumeric symbols, which can be used for advertising or information purposes, are also possible as motifs. These symbols can be made detectable either by the optical structure or by corresponding colouring. A light-directing and glare-reducing device can be especially advantageously implemented so that the lower light-directing elements direct incident light strongly upward in a bundled form, whereas the upper light-directing elements direct incident light into the depth of the room in a flatly bundled form, so that an even distribution of scattered light in the room is generated. Targeted projection of a coloured logo, symbol or writing is also possible. This formation can then be provided, for example, on a corresponding window pane or similar. According to a preferred embodiment of the present invention, it is provided that the substrate comprising the imprinted optical structure and/or the imprinted picture comprises a billboard, a poster, a decorative surface, a cladding element, a facade cladding, a brochure or periodical page, a cover sheet, a picture, a packaging (e.g. a food packaging), a label, a house number, a window image, a screen, a lampshade, a diffusing screen, an adhesive label, a plate, a computer screen and/or similar.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

BRIEF DESCRIPTION OF THE DRAWINGS

FIGS. 4 and 4A schematically show a print head according to an exemplary third embodiment of the present invention.

DETAILED DESCRIPTION

Figure 1:
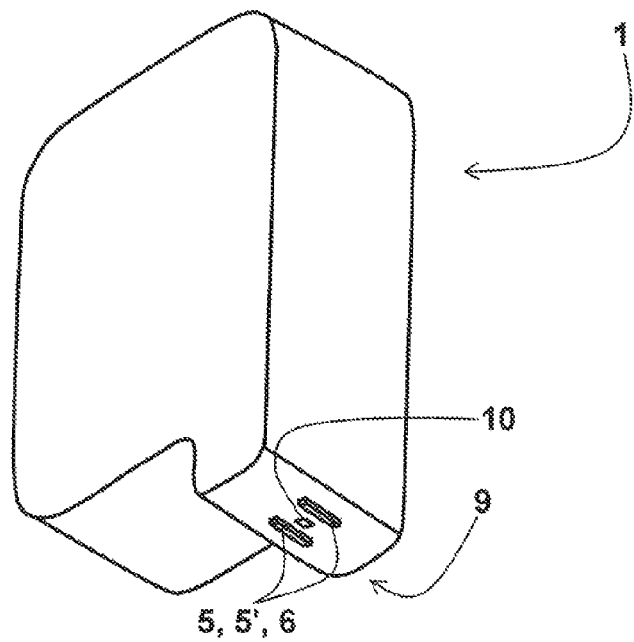
FIGS. 1 and 2 schematically show a print head according to an exemplary first embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

Figure 2:
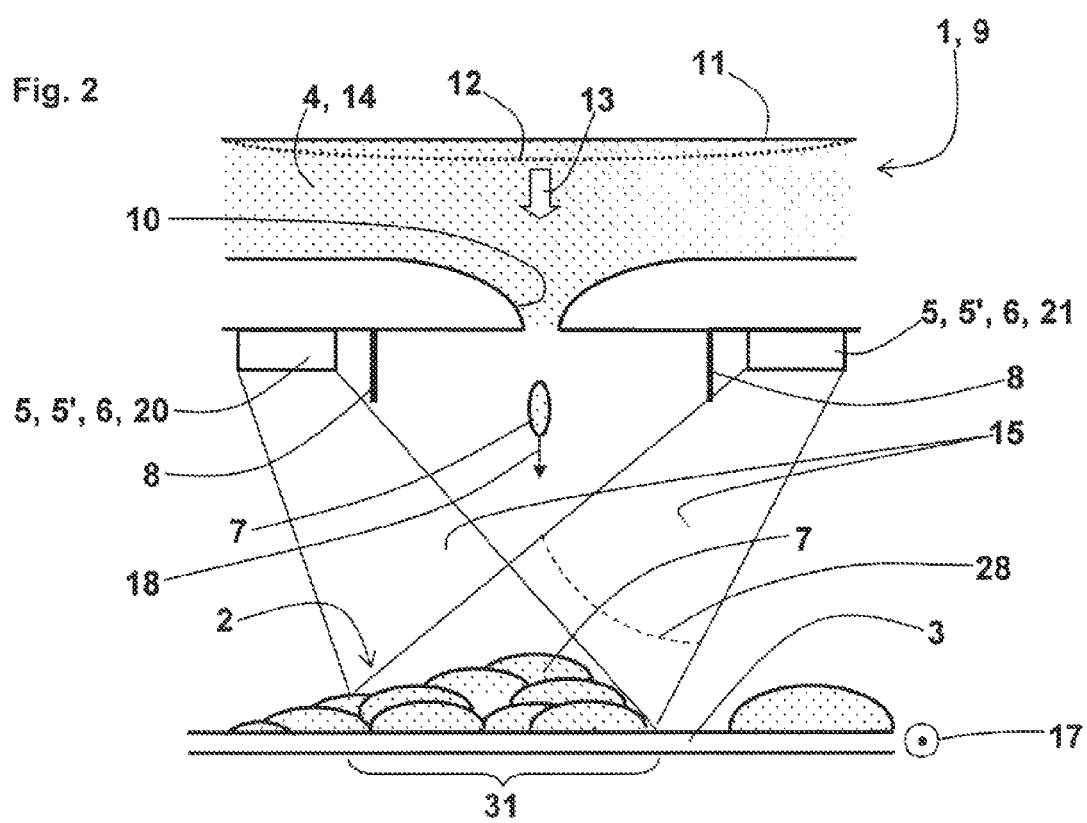

FIGS. 1 and 2 schematically show an example a print head 1 according to an exemplary first embodiment of the present invention.

FIG. 1 illustrates a print head 1 having an ejecting device 9 and a curing device 5 at its bottom side. The ejecting device 9 comprises an ejecting nozzle 10 for ejecting droplets 7 of a liquid polymer-based printing ink 4 provided in an inner chamber 14 of the print head 1 (not shown in FIG. 1). The ejecting device 9 is applicable for ejecting the droplets 7 onto a substrate 3 (not shown in FIG. 1) in order to generate optical structures 2 like optical lenses, optical prism and/or Fresnel structures on the substrate 3. The substrate 3 is preferably made of a transparent synthetic film material or a glass plane, wherein the printing ink is transparent ink curable by ultraviolet light. The curing device 5 comprises two UV-LED's 5' (ultraviolet emitting light-emitting diode) for curing the deposited droplet 7, wherein the nozzle 10 is located between these two UV-LED's 5'. The print head 1 fits into a conventional inkjet printer (not shown in FIG. 1), so that a conventional inkjet printer can be upgraded for printing optical structures 2 simply by replacing the conventional print head by the print head 1 according to the present invention. Preferably, the print head 1 shown in FIG. 1 is a part of an inkjet printer and/or is a part of an upgrade kit for a conventional inkjet printer.

FIG. 2 shows a cross-sectional view of the print head 1 illustrated in FIG. 1. The print head 1 uses a piezoelectric material 11 in the ink-filled chamber 14 behind the nozzle 10. When a voltage is applied to the piezoelectric material 11, the piezoelectric material 11 changes its shape (see doted curve 12), which generate a pressure pulse 13 in the liquid printing ink 4 in the chamber 14 forcing a droplet 7 of the printing ink 4 from the nozzle 10 towards the substrate 3 along the ejection direction 18 (the ejection direction 18 is directed perpendicular to the plane of the substrate 3 in the present example). The droplet 7 is deposited on the substrate 7 onto other previous printed droplets 7' in order to generate the optical structure 2. Subsequently, the UV-LED's 5' are enabled, so that the deposited droplet 7 is cured due to irradiation with ultraviolet light from the UV-LED's 5'. Each of the two UV-LED's 5' is provided with a focusing optic 6, e.g. a microlens, to focus the respective ultraviolet light exactly beneath the nozzle 10 and on the deposited droplet 7. This ensures that the adjacent droplets 7' are not irradiated again. The light cones 15 of the UV-LED's 5' overlaps each other substantially only in the area of the droplet 7 to be cured (overlapping area 31). The respective power of the UV-LED's 5' is adjusted in such a manner that the overall energy deposition of the UV-LED's 5' is only in the overlapping area 31 high enough to cure the printing ink 7 in a short time period, like e.g. maximum 50 milliseconds. Furthermore, the print head 1 comprises shielding panels 8 (not shown in FIG. 1) extending from the print head 1 towards the substrate 1 and located between the UV-LED's 5' and the nozzle 10. The shielding panels 8 shields the nozzle 10 against ultraviolet light directly emitted by the UV-LED's 5' to ensure that the printing ink 4 is not cured in the area of the nozzle 10, because otherwise the nozzle 10 could be clogged by cured printing ink 4. As exemplary shown in FIG. 2, the optical structure 2 comprises an optical prism in the present example. The size of the respective droplets 7 depends on the amount of printing ink 4 ejected by the nozzle 10 at once. Printing the optical structure 2 preferably comprises computer-controlled steps of moving the print head 1 to a certain position relatively to the substrate 2, ejecting a certain amount of printing ink 4 as a droplet 7 towards the substrate 3 and curing the deposited droplet 7 by the overlapping ultraviolet light emitted from the two UV-LED's 5', wherein these steps are repeated several times until the desired optical structure 2 is generated. Meanwhile, the substrate 3 moves along a conveying direction 17 through the printer. It is conceivable that furthermore a picture, like a motif, lettering, logo or the like, is printed onto the substrate 3 by the same print head 1, wherein the printing of the picture is performed before, during or after printing the optical structure 2. The step of printing the picture is accomplished by depositing conventional colored printing ink onto the substrate 2, wherein the printing head 1 comprises an additional printing ink tank (not shown in FIG. 2) storing the conventional colored printing ink and an additional ejection device (not shown in FIG. 2) for ejecting the conventional colored printing ink from the additional printing ink tank to the substrate 3. The print head 1 preferably comprises a laser as a visual positioning aid (not shown in FIG. 2) to increase the positioning accuracy. Preferably, the step of curing the deposited droplets 7 comprises a first step of enabling only a first UV LED 20 of the two UV LED's 5' in order to cure only a portion of the outer surface of the droplets 7 (to avoid that the droplets melt away from the optical structure 2) and a second step of enabling also the second UV LED 21 of the two UV LED's 5', wherein the second step is accomplished subsequently to the first step. The droplets 7 located in the overlapping area 31 are completely cured within a maximum time interval of 50 milliseconds. Each of the light cones 15 comprise a maximum aperture angle 28 of 30 degrees.

Figure 3:
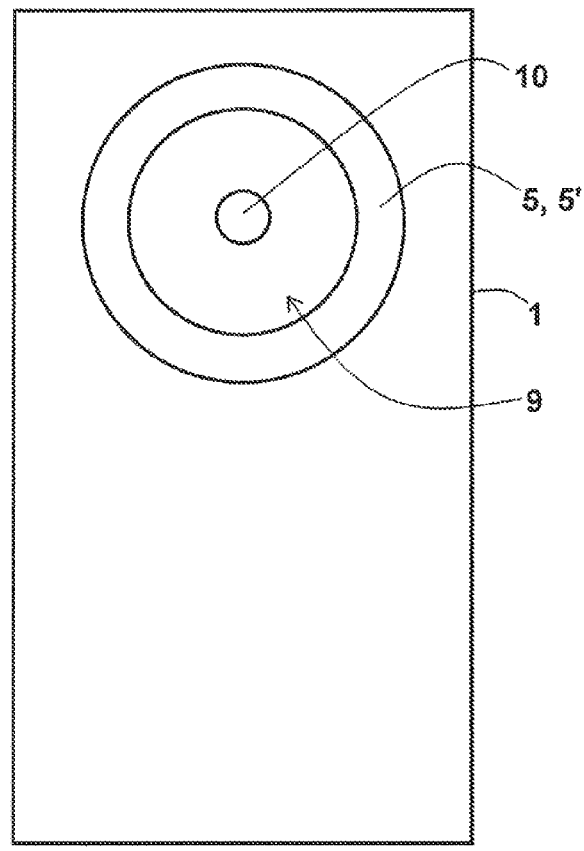
FIG. 3 schematically shows a print head according to an exemplary second embodiment of the present invention.

FIG. 3 schematically shows a bottom surface of a print head 1 according to an exemplary second embodiment of the present invention, wherein the print head 1 according to the second embodiment is very similar to the print head 1 according to the first embodiment illustrated in FIGS. 1 and 2, wherein the nozzle 10 is surrounded by one single ring-like UV-LED 5'.

Figure 4:
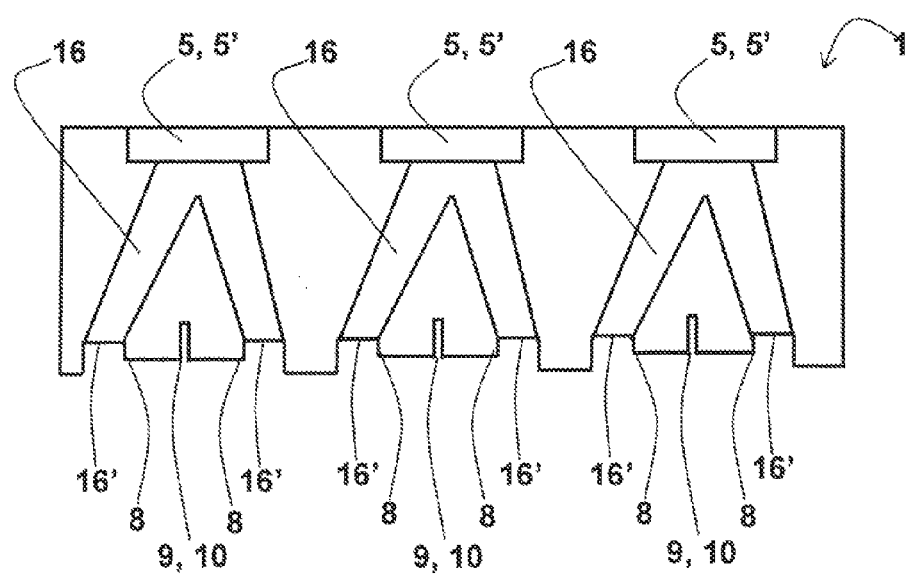

In FIG. 4 a print head 1 according to an exemplary third embodiment of the present invention is schematically illustrated. The third embodiment is substantially similar to the first embodiment illustrated in FIGS. 1 and 2, whereby the print head 1 according the third embodiment comprises UV LED's 5' and multiple ejection devices 9 each having a nozzle 10. In contrast to FIG. 1, the UV LED's 5' are located not on the substrate facing side of the print head 1, but rather on an opposite side of the print head 1 facing away from the substrate 3. Furthermore, the print head 1 comprises three light guiding means 16, wherein each light guiding means 15 conducts ultraviolet light emitted by one single UV-LED 5' through the whole print head 1 towards two light exit openings 16' on the substrate facing side of the print head 1. Thus, ultraviolet light of each UV-LED 5' is distributed to the two light exit openings 16' in equal parts. The nozzle 10 of each ejection device 9 is provided respectively between theses two light exit openings 16'. In order two avoid direct irradiation of the nozzles 10 by the light exit openings 16', each of the light exit openings 16' are provided in a recess on the substrate facing side of the print head 1, so that a shielding edge as shielding means 8 are located between the light exit openings 16' and the nozzles 10. Preferably, every ejection device 9 is connected to a certain ink tank (not shown in FIG. 4) comprising a certain printing ink 4. FIG. 4A illustrates the print head 1 of FIG. 4 where the light guide means 16 is provided between the ultraviolet emitting light-emitting diode 5' and a focusing optic 6.

Figure 5:
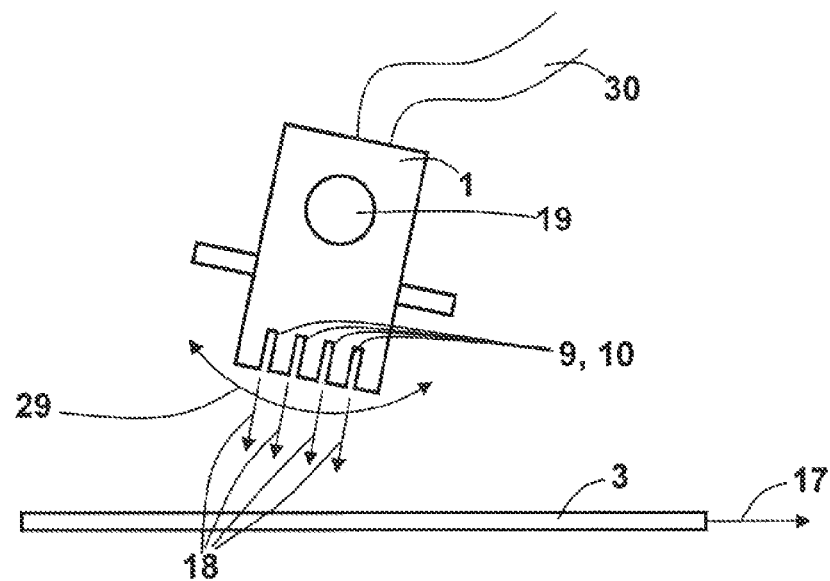
FIG. 5 schematically show a print head according to an exemplary fourth embodiment of the present invention.

In FIG. 5 a print head 1 according to an exemplary fourth embodiment of the present invention is schematically shown. The fourth embodiment is substantially similar to the third embodiment illustrated in FIG. 4, wherein the print head 1 is provided rotatable about a pivot axle 19 along a swiveling direction 29. The pivot axle 19 extends perpendicular to the conveying direction 17 of the substrate 3 and parallel to the plane of the substrate 3. Therefore, the four ejection devices 9 are rotatable in such a manner that the ejection directions 18 of the ejected droplets 7 are movable relatively to the conveying direction 17 of the substrate 3. Preferably the print head 1 comprises a stepper motor (not shown in FIG. 5) swiveling the print head 1 together with the ejection devices 9 about the pivot axle 19 in order to adjust the position and the shape of the deposited droplets 7 relatively to the substrate 3 along the conveying direction 17. Thus, multiple droplets can be deposited on the same position of the substrate 3 and inaccuracies of the position of the substrate 3 along the conveying direction 17 can be compensated by correspondingly adjusting the rotation of the print head 1. The print head 1 comprise a data cable 30 for connecting the print head 1 with an external computer (not shown).

Figure 6:
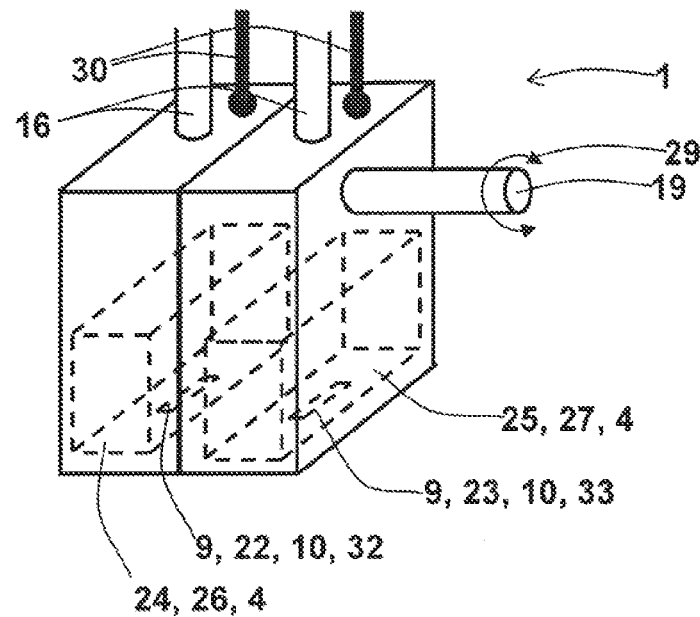
FIG. 6 schematically show a print head according to an exemplary fifth embodiment of the present invention.

FIG. 6 schematically shows a print head 1 according to an exemplary fifth embodiment of the present invention. The fourth embodiment is substantially similar to the fourth embodiment of the print head 1 illustrated in FIG. 5, whereby the print head 1 according the fifth embodiment comprises two print head portions 40, 41. The first portion 40 comprises a first ink tank 26 and a first ejection device 22, wherein the first ink tank 26 is filled with a first printing ink 24 and wherein the first ejection device 22 comprises a first nozzle 32. The first ejection device 22 is connected to the first ink tank 26, so that the droplets 7 ejected by the first nozzle 32 consists of the first printing ink 24. Similarly, the second portion 41 comprises a second ink tank 27 and a second ejection device 23, wherein the second ink tank 27 is filled with a second printing ink 25 and wherein the second ejection device 23 comprises a second nozzle 33. The second ejection device 23 is connected to the second ink tank 27, so that the droplets 7 ejected by the second nozzle 33 consist of the second printing ink 25. The print head 1 is rotatable about the pivot axle 19 along the swiveling direction 29. Each of the first and second print head portions 40, 41 is connected to an external computer via an own data cable 30. Furthermore, each of the first and second print head portions 40, 41 is connected to an external UV LED (not shown in FIG. 6) about flexible light guiding means 16 comprising e.g. fibre optic cables. Each of these light guiding means 16 passes the whole print head 1 and comprises a light exit opening on the substrate facing bottom of the print head 1. These parts of the light guiding means 16 are not shown in FIG. 6 for reasons of clarity. Preferably, the first printing ink 24 differs from the second printing ink 25 in the required curing wavelength. The first printing ink 24 is curable by ultraviolet light of the first wavelength range and the second printing ink 25 is curable by ultraviolet light of the second wavelength range, wherein the second wavelength range differs at least partially from the first wavelength range. Particularly preferably, a first UV LED 5' connected with the light guiding means 16 of the first portion 40 is capable of emitting ultraviolet light of the first wavelength range, wherein a second UV-LED 5' connected with the light guiding means 16 of the second portion 41 is capable of emitting ultraviolet light of a second wavelength range. Furthermore, it is conceivable that the seize of the droplets 7 ejected by the first ejection device 22 differs from the seize of the droplets 7 ejected by the second ejection device 23.

Figure 7:
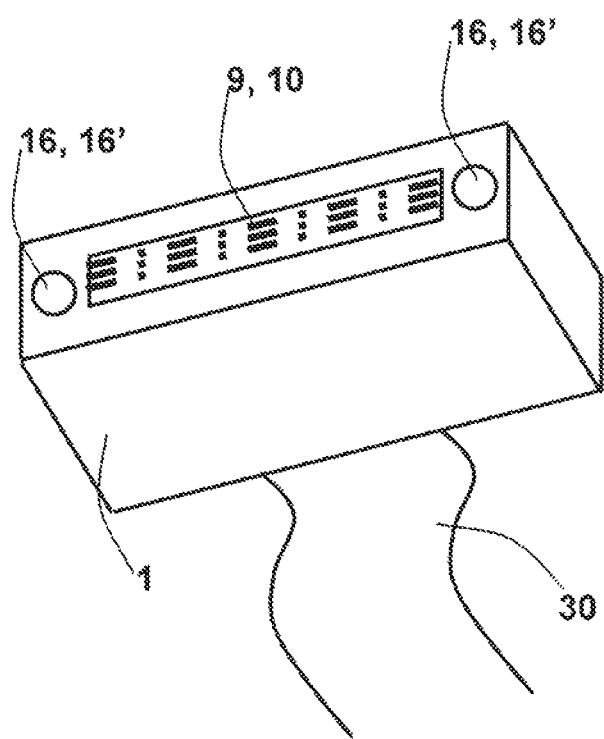
FIG. 7 schematically show a print head according to an exemplary sixth embodiment of the present invention.

In FIG. 7 a print head 1 according to an exemplary sixth embodiment of the present invention is schematically illustrated. The sixth embodiment is substantially similar to the first embodiment shown in FIGS. 1 and 2, whereby the print head 1 comprises multiple ejection devices 9 each having its own nozzle 10. The print head 1 comprises two light guiding means 16 each with a light exit opening 16' at the substrate facing side to guide ultraviolet light from the UV LED's 5' (not shown in FIG. 7) towards the deposited droplets 7 to be cured. Furthermore, the print head 1 comprises a data cable 30 for data communication with an external computer controlling the printing procedure.

LIST OF REFERENCE NUMERALS 1 print head
2 optical structure
3 substrate
4, 24, 25 printing ink
5 curing device
5', 20, 21 UV-LED
6 focusing optic
7 droplets
8 shielding means
9, 22, 23 ejection device
10 nozzle
11 piezoelectric material
12 doted curve
13 pressure pulse
14 chamber
15 light cone
16 light guiding means
16' light exit opening
17 conveying direction
18 ejection direction
19 pivot axle
26, 27 ink tank
28 aperture angle
29 swiveling direction
30 data cable
31 overlapping area

The invention claimed is:

1. A print head for printing optical structures on a substrate comprising:
an ejection device for ejecting at least one droplet of a printing ink towards the substrate and
a curing device for curing the at least one deposited droplet,
wherein the curing device comprises at least one ultraviolet emitting light-emitting diode;
wherein the at least one ultraviolet emitting light-emitting diode is at least two ultraviolet emitting light-emitting diodes and/or at least two light exit openings,
wherein the at least two ultraviolet emitting light-emitting diodes and/or the at least two light exit openings are provided in such a manner that light cones emitted by each of the at least two ultraviolet emitting light-emitting diodes and/or the at least two light exit openings overlap each other in the area of the at least one deposited droplet;
wherein the at least two ultraviolet emitting light-emitting diode are configured for being enabled sequentially; and
wherein the power of the at least two ultraviolet emitting light-emitting diodes and/or of the ultraviolet light emitted by the at least two light exit openings are adjusted in such a manner, that the deposited droplets are substantially cured only in the overlapping area of the light cones emitted by each of the at least two ultraviolet emitting light-emitting diode and/or by each of the at least two light exit openings, in particular during a period of time shorter than 250 milliseconds.

2. The print head according to claim 1, wherein the at least one ultraviolet emitting light-emitting diode comprises an ultraviolet emitting light-emitting diode which substantially emits ultraviolet light with wavelengths between 2 and 380 nanometer and in particular between 320 and 380 nanometer.

3. The print head according to claim 1, wherein the print head is movable relative to the substrate,
wherein the print head is movable in parallel to a plane of the substrate to deposit droplets of the printing ink at a certain position on the substrate; and/or
wherein the print head is movable perpendicularly to the plane of the substrate to adjust the distance between the ejecting device and the substrate.

4. The print head according to claim 1, wherein the ejection device is rotatable in such a manner that an ejection direction of the at least one droplet of printing ink is movable relatively to the substrate and preferably parallel to a conveying direction of the substrate.

5. The print head according to claim 4, wherein the ejection device is rotatably supported around a pivot axle extending perpendicular to the conveying direction and parallel to the plane of the substrate,
wherein preferably the print head comprises a stepper motor swiveling the ejection device about the pivot axle.

6. The print head according to claim 1, wherein the curing device comprises a light guide means conducting ultraviolet light from the at least one ultraviolet emitting light-emitting diode towards the deposited droplet;
wherein the light guide means comprises a light exit opening provided on the substrate facing side of the print head; and/or
wherein the light guide means is configured for collecting ultraviolet light from multiple ultraviolet emitting light-emitting diodes and/or for distributing ultraviolet light on multiple light exit openings.

7. The print head according to claim 1, wherein the curing device is provided with at least one focusing optic for focusing ultraviolet light emitted by the at least one ultraviolet emitting light-emitting diode towards the at least one deposited droplet,
wherein the focusing parameters of the focusing optic are adjustable, and/or
wherein the light guide means are provided between the at least one ultraviolet emitting light-emitting diode and the at least one focusing optic.

8. The print head according to claim 1, wherein the print head comprises at least one shielding means in order to avoid straight irradiation of the ejection device by ultraviolet light, wherein the at least one shielding means is provided at least partially between the ejection device and the at least one ultraviolet emitting light-emitting diode and/or between the ejection device and the light exit opening,
wherein the shielding means comprises a shielding panel and/or a shielding edge.

9. The print head according to claim 1, wherein the ultraviolet emitting light-emitting diode is embodied substantially annularly, and
wherein the ejection device is located in the center of the ring-like ultraviolet emitting light-emitting diode.

10. A print head for printing optical structures on a substrate comprising:
an ejection device for ejecting at least one droplet of a printing ink towards the substrate and
a curing device for curing the at least one deposited droplet, wherein the curing device comprises at least one ultraviolet emitting light-emitting diode;
wherein the at least one ultraviolet emitting light-emitting diode is at least two ultraviolet emitting light-emitting diodes and/or at least two light exit openings,
wherein the curing device comprises at least two ultraviolet emitting light-emitting diodes and/or at least two light exit openings,
wherein the at least two ultraviolet emitting light-emitting diodes and/or the at least two light exit openings are provided in such a manner that light cones emitted by each of the at least two ultraviolet emitting light-emitting diodes and/or the at least two light exit openings overlap each other in the area of the at least one deposited droplet;
wherein a first ultraviolet emitting light-emitting diode of the at least two ultraviolet emitting light-emitting diodes emits ultraviolet light of a first wavelength range and a second ultraviolet emitting light-emitting diode of the at least two ultraviolet emitting light-emitting diodes emits ultraviolet light of a second wavelength range,
wherein the second wavelength range differs at least partially from the first wavelength range.

11. A print head for printing optical structures on a substrate comprising:
a first ejection device for ejecting at least one droplet of a printing ink towards the substrate;
a curing device for curing the at least one deposited droplet, the curing device comprises at least one ultraviolet emitting light-emitting diode; and
a second ejection device for ejecting at least one droplet of a second printing ink towards the substrate;
wherein a nozzle of the first ejection device and a nozzle of a second ejection device elect different amounts of the first printing ink and the second printing ink respectively so that a size of the at least one droplet of the first printing ink differs from a size of the at least one droplet of the second printing ink;
wherein the nozzles of the first ejection device and the nozzles of the second ejection device are configured to dispense droplets so that the droplets are arranged side by side and one above the other partly overlapping each other, so that an optical structure in form of a three dimensional structure which optically influences light passing through the optical structure; and
wherein the second printing ink differs from the first printing ink in at least one physical parameter, and the physical parameters comprise curing time, curing temperature, curing wavelength, viscosity, transmittance, and/or optical transparency.

12. The print head according to claim 11, wherein the first printing ink is curable by an ultraviolet light having a first wavelength range and wherein the second printing ink is curable by an ultraviolet light having a second wavelength range.

13. The print head according to claim 11, wherein the print head comprises at least a first and a second ink tank,
wherein the first ink tank comprises the first printing ink and the second ink tank comprises the second printing ink and
wherein the first ejecting device is connected to the first ink tank and the second ejecting device is connected to the second ink tank.

14. The print head according to claim 10, wherein the ultraviolet emitting light-emitting diode, the light guide means, and/or the focusing optics are provided in such a manner that the ultraviolet light emitted by the at least one ultraviolet emitting light-emitting diode towards the at least one deposited droplet comprises an aperture angle smaller than 30 degrees.

15. The print head according to claim 1, wherein the printing ink comprises a transparent material, a transparent polymer, and/or that the print head comprises a further ejecting device for ejecting visible printing ink.

16. The print head according to claim 1, wherein the print head further comprises a receptacle for an ink cartridge containing the printing ink and/or a connecting piece for receiving the printing ink via an external supply system.

17. An upgrade kit for a conventional inkjet printer for printing optical structures on a substrate comprising: the print head according to claim 1.

18. An inkjet printer comprising: a print head according to claim 1.

19. A method for printing optical structures on a substrate by using the print head according to claim 1, comprising:
providing the substrate,
ejecting at least one droplet of a printing ink towards the substrate, and
curing the at least one deposited droplet,
wherein the at least one deposited droplet is cured by ultraviolet light emitted from at least two ultraviolet emitting light-emitting diodes; and
wherein curing the at least one droplet is performed by firstly activating a first ultraviolet emitting light-emitting diode of the at least two ultraviolet emitting light-emitting diodes and subsequently activating a second ultraviolet emitting light-emitting diode of the at least two ultraviolet emitting light-emitting diodes.

20. The method according to claim 19, wherein the ultraviolet light is conducted from the at least two ultraviolet emitting light-emitting diodes to the at least one deposited droplet to be cured by a light guide means.

21. The method according to claim 19, wherein the ultraviolet light is focused on the at least deposited droplet to be cured by a focusing optic.

22. The method according to claim 19, further comprising conveying the substrate relatively to the printing head along a conveying direction and
rotating the ejection device about a pivot axle extending perpendicular to the conveying direction and parallel to the plane of the substrate.

23. The method according to claim 19, further comprising moving the print head to a certain position relatively to the substrate, before ejecting the at least one droplet.

24. The method according to claim 23, further comprising rotating the ejection device,
moving the print head,
ejecting the at least one droplet, and/or
curing the at least one deposited droplet are repeated one or more times in order to generate an optical structure.

25. The method according to claim 19, wherein the quantity of the ejected printing ink to generate the at least droplet is adjusted depending on the optical structure to be printed and/or depending on the position of the print head relatively to the substrate.

26. The method according to claim 19, further comprising printing a visible picture onto the substrate by the print head and/or by a further print head, before, during, or after the optical structure is printed onto the substrate.

27. The method according to claim 19, wherein the power of the at least two ultraviolet emitting light-emitting diodes is adjusted in such a manner that the deposited droplets are substantially cured only in the overlapping area of the light cones emitted by each of the at least two ultraviolet emitting light-emitting diodes, during a period of time shorter than 250 milliseconds and preferably shorter than 50 milliseconds.

28. A method for printing optical structures on a substrate by using the print head according to claim 1, comprising:
providing the substrate,
ejecting at least one droplet of a printing ink towards the substrate, and
curing the at least one deposited droplet,
wherein the at least one deposited droplet is cured by ultraviolet light emitted from at least two ultraviolet emitting light-emitting diodes;
wherein curing the at least one droplet comprises a step of emitting ultraviolet light of a first wavelength range from a first ultraviolet emitting light-emitting diode of the at least two ultraviolet emitting light-emitting diodes and
a step of emitting ultraviolet light of a second wavelength range from a second ultraviolet emitting light-emitting diode of the at least two ultraviolet emitting light-emitting diodes,
wherein the second wavelength range at least partly differs from the first wavelength range.

29. A method for printing optical structures on a substrate by using the print head according to claim 1, comprising:
providing the substrate,
ejecting at least one droplet of a printing ink towards the substrate, and
curing the at least one deposited droplet,
wherein the step of curing the at least one deposited droplet is performed by using ultraviolet light emitted from at least one ultraviolet emitting light-emitting diode;
further comprising ejecting at least one droplet of a first printing ink and
a step of ejecting at least one droplet of a second printing ink,
wherein the size of the at least one droplet of the first printing ink differs from the size of the at least one droplet of the second printing ink, and/or
wherein the second printing ink differs from the first printing ink in at least one physical parameter, and
wherein the physical parameters preferably comprises curing time, curing temperature, curing wavelength, viscosity, transmittance, and/or optical transparency.

30. The method according to claim 29, wherein the first printing ink is curable by ultraviolet light of a first wavelength range and wherein the second printing ink is curable by ultraviolet light of a second wavelength range, wherein the second wavelength range at least partially differs from the first wavelength range.

31. The method according to claim 19, wherein the printing ink is a first printing ink that is ejected by a first ejection device and a second printing ink is ejected by a second ejection device,
wherein the first ejection device is connected to a first ink tank and the second ejection device is connected to a second ink tank.

32. The print head according to claim 10, wherein the print head is movable relative to the substrate,
wherein the print head is movable in parallel to a plane of the substrate to deposit droplets of the printing ink at a certain position on the substrate; and/or
wherein the print head is movable perpendicularly to the plane of the substrate to adjust the distance between the ejecting device and the substrate.

33. The print head according to claim 10, wherein the ejection device is rotatable in such a manner that an ejection direction of the at least one droplet of printing ink is movable relatively to the substrate and preferably parallel to a conveying direction of the substrate.

34. The print head according to claim 10, wherein the curing device is provided with at least one focusing optic for focusing ultraviolet light emitted by the at least one ultraviolet emitting light-emitting diode towards the at least one deposited droplet,
wherein the focusing parameters of the focusing optic are adjustable, and/or
wherein the light guide means are provided between the at least one ultraviolet emitting light-emitting diode and the at least one focusing optic.

35. The print head according to claim 10, wherein the print head comprises at least one shielding means in order to avoid straight irradiation of the ejection device by ultraviolet light, wherein the at least one shielding means is provided at least partially between the ejection device and the at least one ultraviolet emitting light-emitting diode and/or between the ejection device and the light exit opening,
wherein the shielding means comprises a shielding panel and/or a shielding edge.

* * * * *